United States Patent
Blair et al.

(10) Patent No.: US 9,959,398 B1
(45) Date of Patent: May 1, 2018

(54) DYNAMIC USER AUTHENTICATION AND AUTHORIZATION

(71) Applicant: IMS Health Incorporated, Danbury, CT (US)

(72) Inventors: Charles Blair, Ontario (CA); Elkin Florez, Ontario (CA)

(73) Assignee: IMS HEALTH INCORPORATED, Danbury, CT (US)

( * ) Notice: Subject to any disclaimer, the term of this patent is extended or adjusted under 35 U.S.C. 154(b) by 0 days. days.

(21) Appl. No.: 14/700,811

(22) Filed: Apr. 30, 2015

(51) Int. Cl.
  *G06F 21/31* (2013.01)
  *H04L 29/06* (2006.01)

(52) U.S. Cl.
  CPC .............. *G06F 21/31* (2013.01); *H04L 63/08* (2013.01); *H04L 63/20* (2013.01)

(58) Field of Classification Search
  CPC ..... H04L 63/20; H04L 63/10; H04L 63/1416; H04L 63/08; H04L 63/1425
  See application file for complete search history.

(56) References Cited

U.S. PATENT DOCUMENTS

| | | | | |
|---|---|---|---|---|
| 6,347,374 B1* | 2/2002 | Drake | ................ | G06F 21/554 709/224 |
| 8,239,923 B2* | 8/2012 | Kirshnan | ................ | G06F 8/67 709/224 |
| 8,726,343 B1* | 5/2014 | Borzycki | ............ | G06F 21/6218 726/1 |
| 2004/0024764 A1* | 2/2004 | Hsu | ................ | G06F 21/31 |
| 2006/0059340 A1* | 3/2006 | Eldenmalm | ............. | G06F 21/31 713/168 |
| 2006/0218621 A1* | 9/2006 | Covington | ............. | H04L 63/08 726/1 |
| 2009/0319806 A1* | 12/2009 | Smith | ................ | G06F 21/575 713/193 |
| 2011/0138166 A1* | 6/2011 | Peszek | ................ | G06F 21/575 713/2 |
| 2012/0240182 A1* | 9/2012 | Narayanaswamy | .. | G06F 9/5077 726/1 |
| 2013/0111547 A1* | 5/2013 | Kraemer | ................ | G06F 21/552 726/1 |
| 2013/0283340 A1* | 10/2013 | Biswas | ................ | G06F 21/44 726/1 |
| 2015/0033286 A1* | 1/2015 | Shahidzadeh | ........... | H04L 63/10 726/1 |
| 2015/0365828 A1* | 12/2015 | Saida | ................ | H04M 3/00 455/411 |
| 2016/0094560 A1* | 3/2016 | Stuntebeck | ........... | H04L 63/102 726/1 |

\* cited by examiner

*Primary Examiner* — Yonas Bayou
(74) *Attorney, Agent, or Firm* — Maldjiian Law Group LLC

(57) ABSTRACT

System and a method to dynamically authenticate and optionally dynamically authorize a user at a user device or at a server, the method including: receiving a request from the user to access a service; determining contextual data associated with the user; determining, based on at least the contextual data, at least one rule from a rules database to authenticate the user; and authenticating the user based on the determined at least one rule, wherein the user is authorized to access the service based on the authentication.

22 Claims, 9 Drawing Sheets

FIG. 1

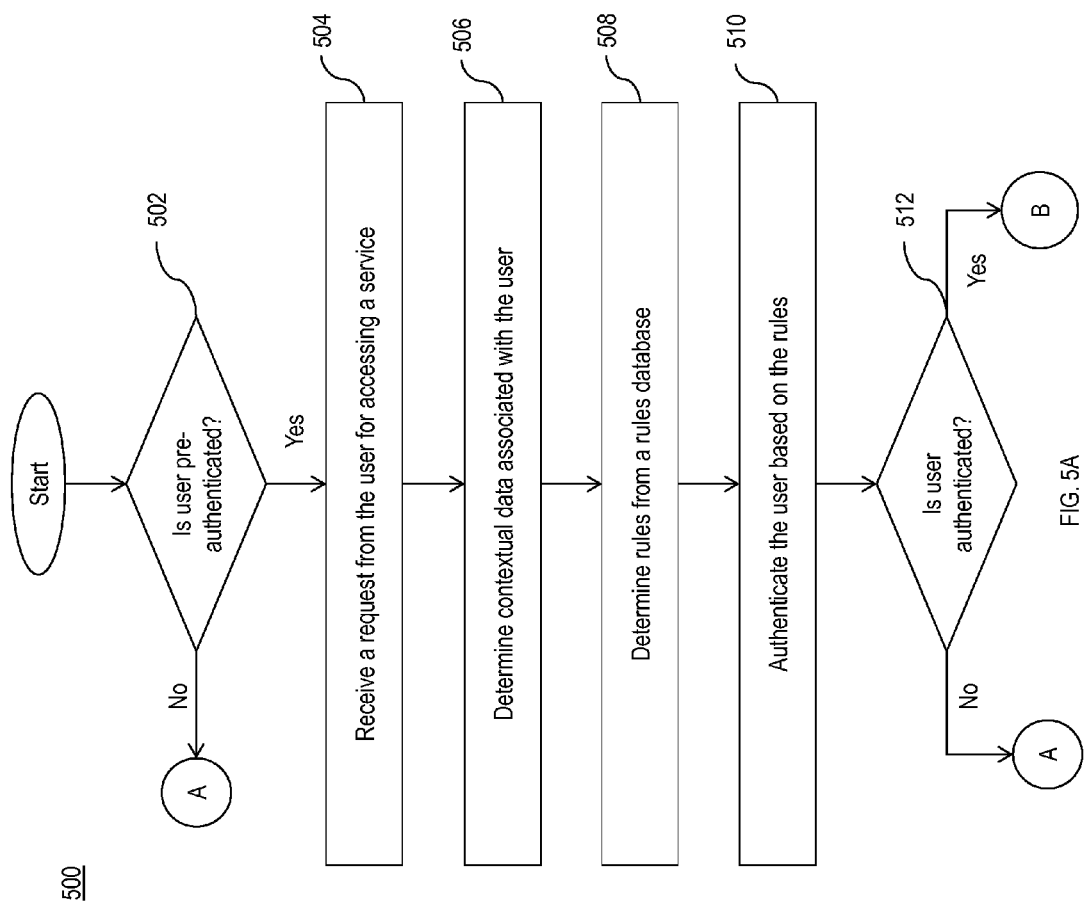

DYNAMIC USER AUTHENTICATION AND AUTHORIZATION

BACKGROUND

Field of the Invention

Embodiments of the present invention generally relate to authentication techniques, and, in particular, to a system and method for dynamic authentication and authorization of a user.

Description of Related Art

Software applications and services generally use various mechanisms for authentication and/or authorization of a user. Typically, the authentication and/or authorization are accomplished by using a password, a response to challenge questions, or other credentials that may be validated against a stored Access Control List (ACL). For example, the user may be required to provide login credentials such as username and/or password to access data stored on a server or a local machine. However, the rules or policies used for authentication in these techniques are static, for example, authentication may be performed based only on the username/password. Further, the authentication typically is performed independently at a client application and a server application, which allows any user to access services assuming that they have a valid password. Furthermore, once the user is authenticated, then access rights are specified for the user based on, for example, an identification in order to access the services. However, the authorization of the user to access all the services is also static. As a result, any unauthorized user may be able to gain access to the service or confidential data just by knowing an authorized user's credentials. Therefore, these authentication and authorization techniques are insecure and insufficient.

Software application developers generally hardcode security components, such as authentication, authorization, and ACL components in the application. Therefore, the application is required to be updated whenever the security components are changed. Further, users of the application are required to acquire and install the updated application to access the latest changes, which is both inconvenient and time consuming. Therefore, secure and dynamic mechanisms for user authentication and authorization are required.

SUMMARY

Embodiments in accordance with the present disclosure provide a method for dynamic authentication of a user at a user device, the method including: receiving a request from the user for accessing a service; determining contextual data associated with the user; determining, based on at least the contextual data, at least one rule from a rules database for authenticating the user; and authenticating the user based on the determined at least one rule, wherein the user is authorized to access the service based on the authentication.

Embodiments in accordance with the present disclosure provide a system for dynamic authentication of a user, the system including: an interface module for receiving a request from the user for accessing a service; a rules database comprising at least one rule for user authentication; a rule engine configured to: determine contextual data associated with the user; determine, based on at least the contextual data, at least one rule from the rule database for authenticating the user; and authenticate the user based on the determined at least one rule, wherein the user is authorized to access the service based on the authentication.

Embodiments in accordance with the present disclosure provide a method for dynamic authentication of a user at a user device, the method including: receiving a request from the user for accessing a service; pre-authenticating the user based on one or more user credentials; determining contextual data associated with the user, based on successful pre-authentication; determining, based on at least the contextual data, at least one rule from a rules database for authenticating the user; and authenticating the user based on the determined at least one rule, wherein the user is authorized to access the service based on the authentication.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 5A and FIG. 5B depict a method for dynamic authentication of a user according to another embodiment of the present disclosure;

Figure 1:
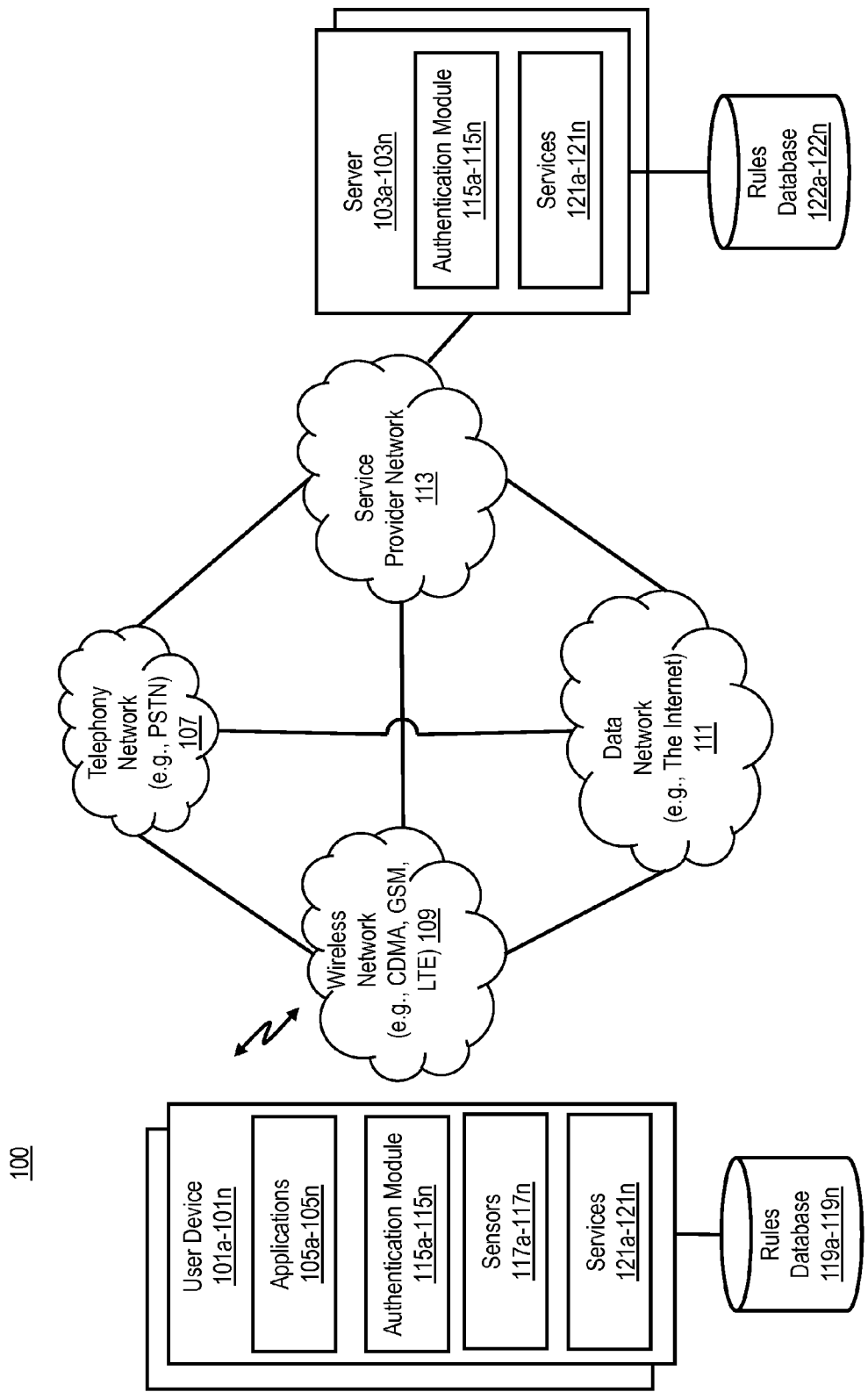
FIG. 1 depicts a system according to an embodiment of the present disclosure.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary digital information system. Although well suited for use with, e.g., a system using a server(s) and/or database(s), the disclosure is not limited to use with any particular type of system or configuration of system elements. Those skilled in the art will recognize that the disclosed techniques may be used in any system or process in which it is desirable to provide a transferable permission to access information or control a decision.

The exemplary systems and methods of this disclosure also will be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It also should be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module also may comprise a logical set of processes irrespective of any software or hardware implementation.

The term "computer-readable medium" as used herein refers to any tangible storage and/or transmission medium that participate in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Embodiments in accordance with the present disclosure are useful because they enable enterprises to preemptively manage application security, by reducing risks associated with transactional services using a mobile application or online service. The risks may include unintentional access to an application and its data, access by unauthorized users to confidential information and/or services using a valid PIN number or password, denial of services to authorized users due to changes in access policy at the server end, and so forth. Embodiments may use rules, contextual and situational content to enable managed services at multiple stages of an application system, thus reducing risky transactions, and supplementing the backend authentication validation process.

Embodiments in accordance with the present disclosure may allow a client application (e.g., mobile applications, desktop applications, web applications, etc.) to utilize a dynamic authentication process for user access. This may be achieved by using rules, rules configurations, contextual and situational content to manage user access at the application. This may allow the client application to manage automatically the user engagement, and to manage access to the business logic or pre-transaction functions. Embodiments of the invention also may be used to determine when transactions can be initiated from the client application to a server application.

Embodiments enable applications to support rules and information sets associated with access information at multiple points or layers of the application. For example, support may be provided at access to the client application business logic, transactions, and server side access and permissions. The steps of authenticating and authorizing information sets may be managed, and updates downloaded in "real time," due to the interactive and transactional characteristics of applications in accordance with embodiments of the present disclosure.

FIG. 1 depicts a system 100 according to an embodiment of the present disclosure. System 100 provides access to services 121a-n based on secure and dynamic authentication and authorization of users. Examples of services 121a-n may include, but are not limited to, online banking, accessing health data from a remote server, accessing account data stored in a user device, social networking, multimedia content, web browsing, and any on other service local or remote from the user device. In some embodiments, users may access the services 121a-n from one or more user device 101a-101n, hereinafter referred to as a user device 101. In one embodiment, the user device 101 may include, but not restricted to, a computer, a laptop, a Personal Digital Assistance (PDA), a tablet, a smart phone, a palmtop, a notebook, and the like. User device 101 may support substantially any type of interface for supporting the presentment of data. In addition, user device 101 may facilitate various input means for receiving, including, but not restricted to, a touch screen capability, a keyboard and keypad data entry, a voice-based input mechanisms, and the like. Any known and future implementations of the user device 101 also may be applicable. In one embodiment of the present disclosure, the user may access the services 121a-n associated with one or more server 103a-103n, hereinafter referred to as server 103. In one embodiment of the present disclosure, the server 103 may be maintained by service providers such as banks, hospitals, utility services, and so forth. In some embodiments of the present invention, like-numbered modules in server 103 and in user device 101 (e.g., services 121*a-n* in user device 101 and services 121*a-n* in server 103) may have different functionalities.

The user device 101 may include applications 105*a*-105*n*, hereinafter referred to as application 105. In one embodiment of the present disclosure, application 105 may be any software application or service such as, but are not restricted to, productivity software, education software, entertainment software, social networking software, web browsing software, communications software, content sharing, multimedia software, map applications, web client, or the like. Further, the application 105 may be, but not restricted to, a desktop application, a mobile application, and so forth.

The server 103 may be a software-controlled system including a processor coupled to a tangible memory. The memory may comprise Random Access Memory (RAM), a Read-Only Memory (ROM), or combinations of these and other types of electronic memory devices. The memory may be used for various purposes such as to store code (e.g., application programs) and working memory used by the processor. Various other server 103 components such as a communication interface modules, power management modules, etc. are known by persons of skill in the art of computer design, but are not depicted in FIG. 1 in order to avoid obscuring the main elements of the system 100.

The user device 101 may access the services 121*a-n* from the server 103 through various computer networks including a telephony network 107, a wireless network 109, a data network 111, a service provider data network 113, and the like. For illustrative purposes, the computer networks 107-113 may be any suitable wired, wireless, or combination thereof networks, which are managed by service providers. For example, the telephony network 107 may include, but is not restricted to, a circuit-switched network, such as the Public Switched Telephone Network (PSTN), an Integrated Services Digital Network (ISDN), a Private Branch Exchange (PBX), or other like networks.

Although depicted as separate entities, the computer networks 107-113 may be contained completely or partially within one another, or may embody of the aforementioned infrastructures. For instance, the service provider network 113 may embody circuit-switched and/or packet-switched networks that may include facilities to provide for transport of circuit-switched and/or packet-based communications. It is further contemplated that the computer networks 107-113 may include components and facilities to provide signaling and/or bearer communications between the various components or facilities of the system 100. In this manner, the computer networks 107-113 may embody or include portions of a Signaling System 7 (SS7) network, or other suitable infrastructure to support control and signaling functions. In addition, the system 100 may operate as separate parts that rendezvous and synchronize periodically to form a larger system with similar characteristics.

Further, the data network 111 may be any Local Area Network (LAN), Metropolitan Area Network (MAN), Wide Area Network (WAN), the Internet, or any other suitable packet-switched network, such as a commercially owned, proprietary packet-switched network, such as a proprietary cable or fiber-optic network. Further, the wireless network 109 may employ various technologies including, for example, Code Division Multiple Access (CDMA), Enhanced Data Rates For Global Evolution (EDGE), General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, e.g., microwave access (Wi-MAX), Wireless Fidelity (WiFi), satellites, and the like.

The system may include an authentication module 115*a*-115*n*, hereinafter referred to as authentication module 115. The authentication module 115 may be stored within the user device 101, according to one embodiment of the present disclosure. In another embodiment, the authentication module 115 may be stored within the server 103. The authentication module 115 may be stored within the user device 101, and the server 103, in yet another embodiment of the present disclosure. In an embodiment of the present invention, the authentication module 115 within the user device 101 may have different functionalities than the authentication module 115 of the server 103. The authentication module 115 may be configured to receive a request from the user to access a service, in one embodiment of the present disclosure. Further, the authentication module 115 may be configured to pre-authenticate the user based on user credentials. The user credentials may include, but not restricted to, a username, a password, a Personal Identification Number (PIN), a biometric identity, and the like. The authentication module 115 may be configured to determine contextual data associated with the user, in one embodiment of the present disclosure. The contextual data may include, but not restricted to, date of request, a time of request, user device parameters, work state, or a combination thereof. The work state may include, but not restricted to, on duty, on a vacation, on a lunch/tea break, and the like. The user device parameter may include, but not restricted to, Internet Protocol address (IP address), Media Access Control address (MAC address), and the like.

The authentication module 115 may further be configured to determine localization data associated with the user device 101, in another embodiment of the present disclosure. The localization data may include, but not restricted, geographical location of user device such as GPS location, position of the user device, and the like. Furthermore, the authentication module 115 may be configured to determine rules based on the contextual data, localization data, or a combination thereof. In general, server-based rules executed by server 103 may be different than client-based rules executed by user device 101. Client-based rules may be stored in client rules database 119*a*-119*n* (hereinafter referred to as rules database 119), and server-based rules may be stored in server rules database 122*a*-122*n* (hereinafter referred to as rules database 122). Each user device 101 may be associated with the rules database 119, according to an embodiment of the present disclosure. The server 103 also may be connected to the rules database 122 through the computer networks 107-113, or is connected directly. The rules databases 119 and 122 also may be external to the user device 101, or the server 103 (as illustrated in FIG. 1), and/or be incorporated into the user device 101, or the server 103. The authentication module 115 may be configured to dynamically authenticate the user to access the services based on the determined rules, according to one embodiment of the present disclosure. The components of the authentication module 115 are described in conjunction with FIG. 2.

The user device 101 also may include sensors 117*a*-117*n*, hereinafter referred to as sensor 117, according to one embodiment of the present disclosure. The sensor 117 may be used, e.g., in order to determine the localization data associated with the user, time of day, date, location coordinates, and the like. In an embodiment, the sensor 117 may be installed within the user device 101 to determine location of the user device 101. In one implementation, the sensor 117 may be, but is not restricted to, a Global Positioning System (GPS) sensor. Sensor 117 may include, but is not limited to, a camera, a microphone, and the like, in an embodiment of the present invention. Sensor 117 also may include a biosensor device such as a fingerprint scanner or a retina scanner.

The elements of the system 100 are shown in FIG. 1 for purposes of illustration only and should not be construed as limiting embodiments of the present invention to any particular arrangement of elements. Various other system components such as a gateway, a firewall, etc. are known by persons of skill in the art of computer networking, but are not depicted in FIG. 1 in order to avoid obscuring the main elements of system 100.

Figure 2:
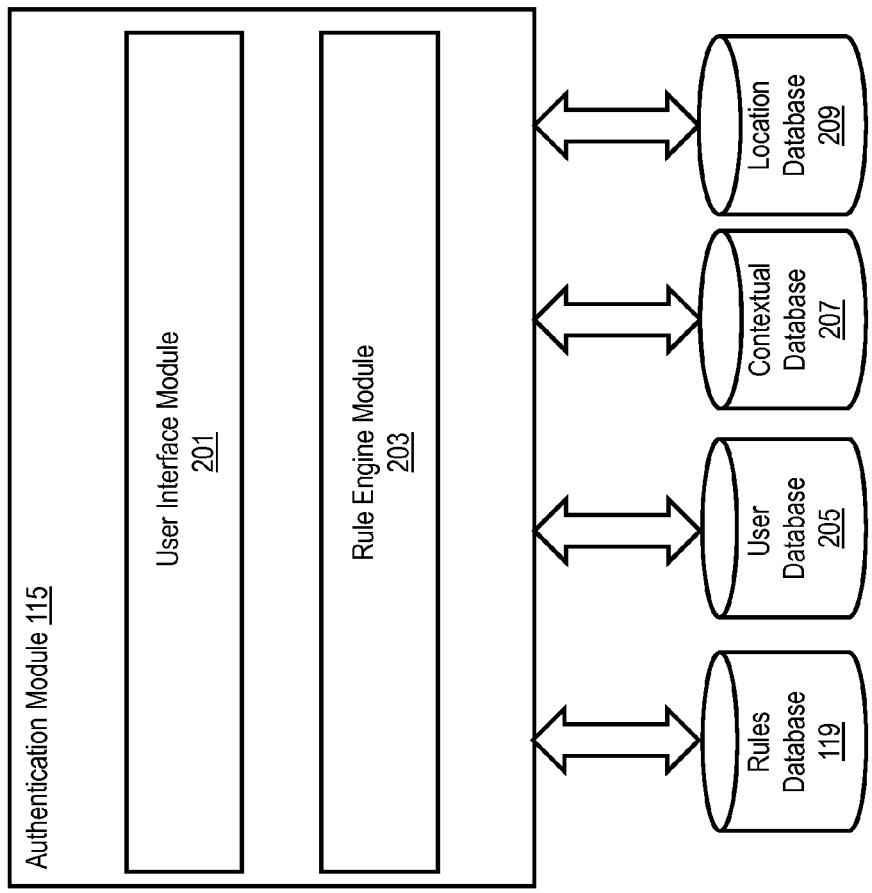
FIG. 2 illustrates components of an authentication module according to an embodiment of the present disclosure.

FIG. 2 is a diagram of components of the authentication module 115 for dynamically authenticating a user of a user device, according to an embodiment of the present disclosure. In one implementation, the authentication module 115 may be implemented as a part of the service provider network 113, a content provider, and the like. The authentication module 115 may include various executable modules for performing one or more computing, data processing, or network based instructions that in combination to provide a means for dynamic authentication of the user at the user device 101, the server 103, or combination thereof. Such modules may be implemented in hardware, firmware, software, or a combination thereof. The authentication module 115 may include, but not restricted to, a user interface module 201, and a rule engine module 203, according to an embodiment of the present disclosure. The authentication module 115 may further be connected to the rules database 119 for user device 101 (or rules database 122 for server 103), a user database 205, a contextual database 207, a location database 209, or a combination thereof.

The user interface module 201 may receive a request from the user, according to an embodiment of the present invention. The request may be to access a service from a remote device such as the server 103, or the user device 101. The service may include, but not restricted to, online banking, accessing health data from a remote server, accessing data stored in a user device, social networking, multimedia content sharing, web browsing, and so forth. Further, the user interface module 201 may receive user inputs such as a username, a password, a Personal Identification Number (PIN), a biometric identity, and the like.

The rule engine module 203 may pre-authenticate the user based on the received inputs, according to another embodiment of the present invention. For example, the rule engine module 203 may pre-authenticate the user based on the username and password received from the user in the user device 101. Further, the rule engine module 203 may retrieve contextual data, for example, date of request, a time of request, user device parameters, work state, or a combination thereof, from the contextual database 207, according to an embodiment of the present disclosure. The rule engine module 203 may retrieve the user credential from the user database 205, in another embodiment of the present disclosure. The user credential may include, but is not restricted to, personal information such as a type of user account, medical condition, medication associated with a user, a name of a hospital, a branch of the hospital, a name of a doctor serving a user, and the like. The rule engine module 203 may retrieve the localization data associated with the user device 101, according to one embodiment of the present disclosure. The sensor 117 of the user device 101 may determine the localization data and store the localization data in the location database 209. The rule engine module 203 may then retrieve the localization data from the location database 209.

The rule engine module 203 for user device 101 may receive a rule from the rules database 119, according to an embodiment of the present invention. Similarly, rule engine module 203 for server 103 may receive a rule from rules database 122. The rule engine module 203 may receive a rule from the rules database 119 over the computer network, such as the computer network 107-113. The rules stored in the rules database 119 may be predefined rules, according to an embodiment of the present invention. The rules may be managed by a set of configurable Application Program Interfaces (APIs), according to an embodiment of the present invention. These rules may be uploaded by a service provider during initialization of the application 105, according to an embodiment of the present disclosure. These rules may be uploaded during runtime from the server 103, according to another embodiment of the present invention. The configurable APIs and the components of the authentication module 115 may be provided as a native code for the desktop or mobile applications, new rules may be implemented without the need to change or modify source code of the application 105 in order to achieve dynamic access control. In another embodiment of the present disclosure, the server 103 may update the rules, change or add rules, or may modify the contextual data or localization data in the rules database 119, contextual database 207, or the location database 209, without modifying the rules, and the like. Therefore, the rule engine module 203 may dynamically update or modify the rules without changing the source code of the application 105. While the functionality of the rule engine module 203 is explained with reference to the client end rule database 119, a person skilled in the art will appreciate that the functionality of the rule engine module 203 also may be explained with reference to the server end rule database 122 implementation. As noted previously, in an embodiment of the present invention, the rules database 119 of the user device 101 may store different rules than the rules database 122 of the server 103.

The rules may be defined by the user, according to another embodiment of the present invention. For example, a rule may be 'provide access to a user when the user is at location 'X' and on weekdays', then the user may access a service on weekdays when the user is currently present on the location 'X'. In another example, a rule may be a user needs to be enrolled in a hospital, not just as a patient, or an emergency, but as a regular patient and this patient may have access to specific condition and if the user has this particular condition has been seen by a specific type of doctor.

Further, the rule engine module 203 may update rules database 119 and/or rules database 122 for the received rules, according to an embodiment of the present invention. Furthermore, the rule engine module 203 may authenticate the user based on the received rule in order to access the service, according to an embodiment of the present invention. Also, the rule engine module 203 may determine the level of authentication of the user, according to an embodiment of the present invention. The level of authentication may relate to the extent of authentication satisfied by the user. For example, to access a service, five rules must be fulfilled in order to access medical data stored on a server, but only two rules are fulfilled then the level of authentication of a user, for example a doctor, is 0.4, then the user may access only subset of the medical data such as names of patients. On the other hand, if all the five rules are fulfilled then the level of authentication is 1 and the user may access all the data such as medical history of the patients. For example, user 'A' and user 'B' may desire to access data from a remote server and two rules are determined, the user 'A' satisfied only one rule, then the level of authentication may be 0.5, then the user 'A' may be authorized a level 0.5 access to only a subset of files, e.g., two files of the data on a weekend, but may access all the files of the data on weekdays and only during office hours, while the user 'B' satisfied the two rules, then the level of authentication may be 1, and therefore the user 'B' may be authorized a level 1 access to all the files on weekdays or weekends. Therefore, the level of authorization may relate to the extent of access allowed to the user for a particular service. In one embodiment of the present disclosure, the level of authorization may be dynamically defined based on the level of authentication. In another embodiment of the present disclosure, the level of authorization may be pre-defined for one or more services 121.

Further, the rule engine module 203 may authorize the user to access the requested service, according to an embodiment of the present invention. The rule engine module 203 may authorize the user to access the requested service based on the level of authentication of the user. The rule engine module 203 may determine whether the user is authorized to access the requested services based on the level of authentication. For example, a user 'A' and a user 'B' may have a level of authentication 0.5, but the level of authorization may be different such that the user 'A' may be authorized to access only a subset 'X' of files while the user 'Y' may be authorized to access only a subset B' of the files. Afterwards, the user may access the requested service based on the level of authentication. The level of authorization may aid to dynamically grant restricted access to the requested services. Therefore, the authentication module 115 also may provide an improved authorization mechanism to grant access to the services 121*a-n*.

Figure 3:
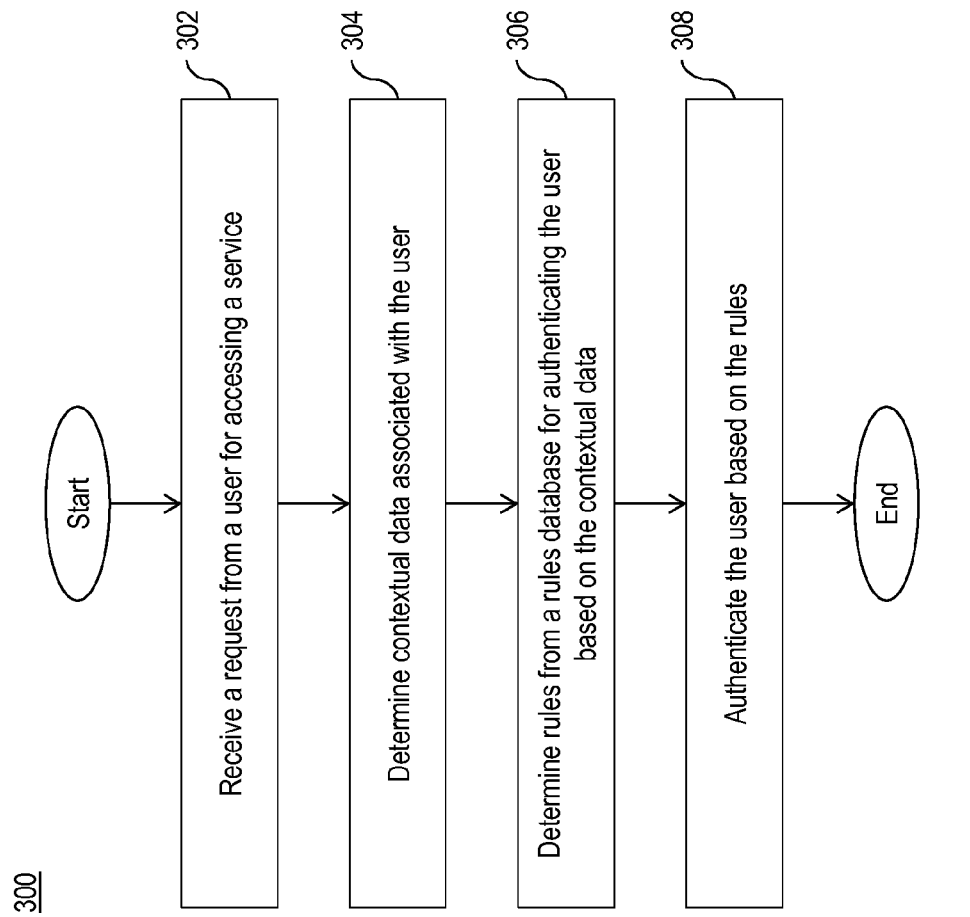
FIG. 3 depicts a method for dynamic authentication of a user according to an embodiment of the present disclosure.

FIG. 3 illustrates a process 300 for dynamic authentication of a user in accordance with an embodiment of the present disclosure. Process 300 begins at step 302, at which a request is received from a user. The request is to access a service from the user device 101, or a remote device such as the server 103.

Next, control of process 300 proceeds to step 304, at which contextual data associated with the user is determined. The contextual data may include, but not restricted to, date of request, a time of request, user device parameters, work state, or a combination thereof. The contextual data associated with the user may be determined from the contextual database 207, according to an embodiment of the present disclosure.

Further, control of process 300 proceeds to step 306, at which rules from a rules database is determined for authenticating the user based on the contextual data. Next, control of process 300 proceeds to step 308, at which the user is authenticated based on the rules. The user may then access the service.

Figure 4:
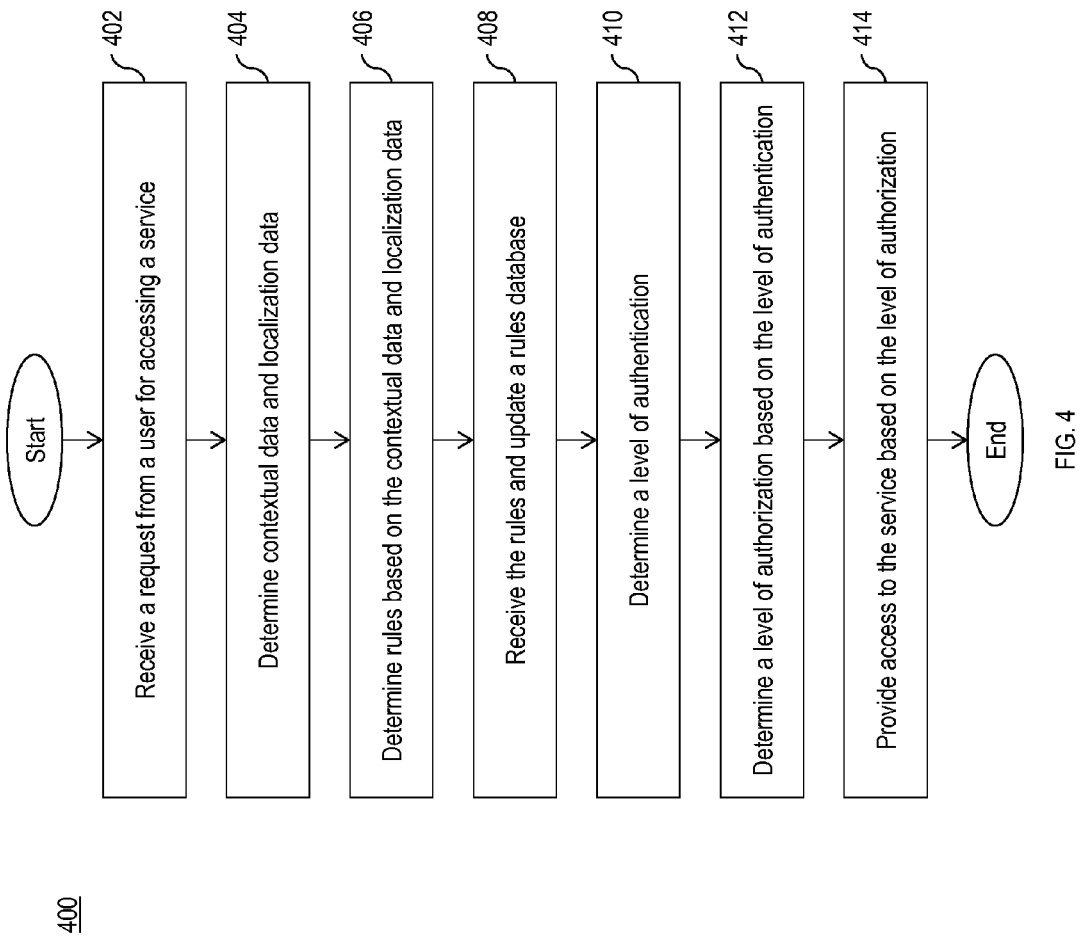
FIG. 4 depicts a method for providing access to a service to a user according to an embodiment of the present disclosure.

FIG. 4 illustrates a process 400 for providing access to a service to a user in accordance with an embodiment of the present disclosure. Process 400 begins at step 402, at which a request is received from a user. The request is to access a service from the user device 101, or a remote device such as the server 103.

Next, control of process 400 proceeds to step 404, at which contextual data and localization data associated with the user and the user device 101 is determined. The contextual data may include, but not restricted to, date of request, a time of request, user device parameters, work state, or a combination thereof. The contextual data associated with the user may be determined from the contextual database 207, according to an embodiment of the present disclosure. The localization data may include, but not restricted, geographical location of user device such as GPS location, position of the user device, and the like. The localization data associated with the user device 101 may be determined from the location database 209, according to an embodiment of the present disclosure.

Further, control of process 400 proceeds to step 406, at which rules from a rules database is determined based on the determined contextual data and the localization data. The determined rules are received from the rules database 119 for user device 101 (or rules database 122 for server 103) and the rules may be updated in rules database 119 and/or rules database 122 at step 408. For example, the rules may be dynamically modified based on the contextual data and the localization data. In an embodiment of the present invention, the user database 205 may be used to feed the rule engine module 203 to take a decision, for example, determine a rule, based on the user specific data.

Thereafter, control of process 400 proceeds to step 410, at which a level of authentication is determined, according to an embodiment of the present disclosure. For example, to access data stored on a server, current location of the user and time of request is required, and in case, if only the time of request is known and the current location is unknown then the user is authenticated to access a subset of the data. Further, control of process 400 proceeds to step 412, at which a level of authorization is determined based on the level of authentication, according to an embodiment of the present disclosure. For example, in the above scenario, the user is authorized to access only the subset of the data and not the entire data. Next, control of process 400 proceeds to step 414, at which an access to the service is provided to the user based on the level of authorization.

In an exemplary scenario, a user desires to perform a transaction through online banking. The user provides a username and password in an application on a mobile phone of the user. Based on the username and password, time of request and location of the user device, i.e., office, a rule 'view account summary when in office' is determined. Further, based on the rule and the username and password, time of request and location of the user device, the user is authenticated and is then authorized to view only the account summary. Further, in case, if the location of the user device is other than the office, then the user is not authenticated and authorized to view the account summary.

Figure 5B:
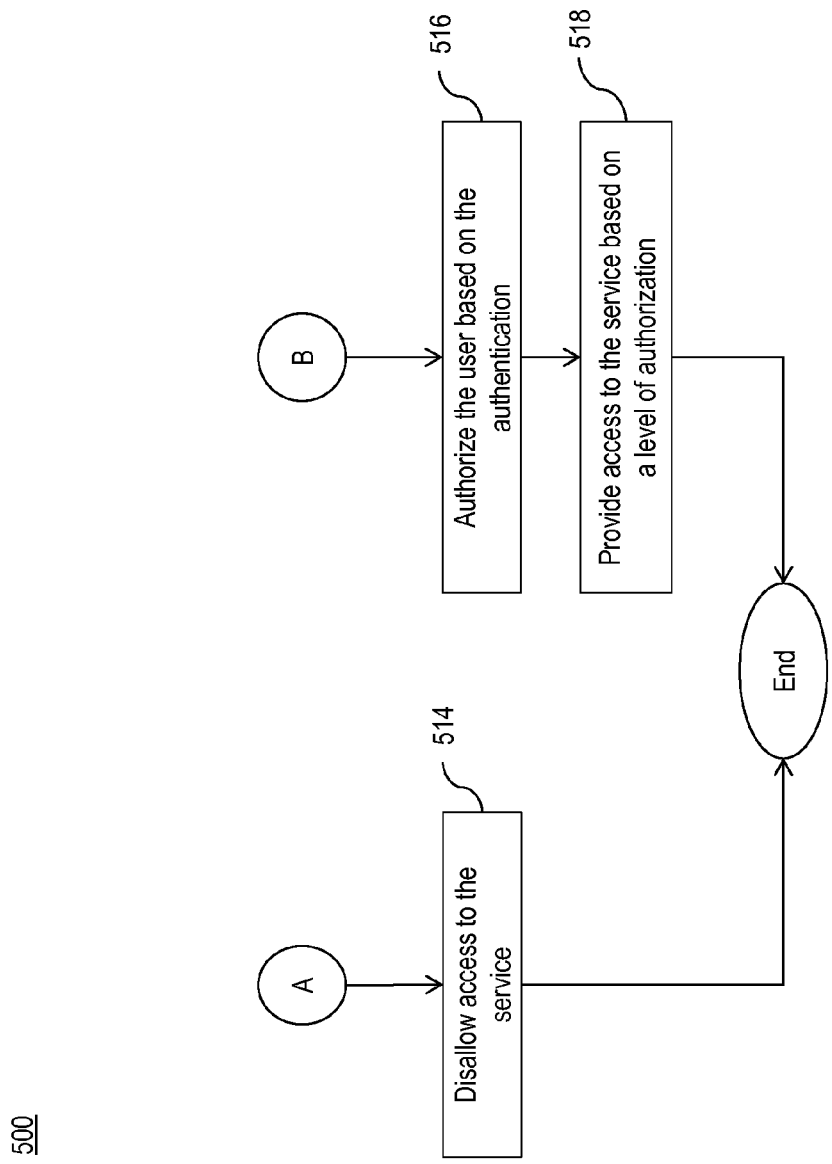

FIG. 5A and FIG. 5B illustrate a process 500 for providing access to a service to a user in accordance with another embodiment of the present disclosure. Process 500 begins at step 502, at which it is determined whether the user is pre-authenticated or not. The user is authenticated at an initial level based on user credentials, for example a username and a PIN. If the user is pre-authenticated, then the process 500 proceeds to step 504. Otherwise, the process 500 proceeds to step 514.

Next, control of process 500 proceeds to step 504, at which a request is received from a user. The request is to access a service 121 from the user device 101, or a remote device such as the server 103.

Further, control of process 500 proceeds to step 506, at which contextual data associated with the user is determined. The contextual data may include, but not restricted to, date of request, a time of request, user device parameters, work state, a server being used, a network being used by a user, or a combination thereof. The contextual data associated with the user may be determined from the contextual database 207, according to an embodiment of the present disclosure.

Next, control of process 500 proceeds to step 508, at which a rule is determined, according to an embodiment of the present disclosure. The rule may be determined based on the contextual data associated with the user, according to an embodiment of the present disclosure. For example, a rule may be 'patient may access full medical history but another user may access only basic details of the patient'.

Furthermore, control of process 500 proceeds to step 510, at which the user is authenticated based on the rule. For example, the patient is authenticated by asking a question such as last drug prescribed by the doctor, may be asked to the user, and if the user answers the question then the user is authenticated to access the medical history. In another embodiment of the present invention, the user may be authenticated by inquiring challenging questions based on the user specific data, for example, but is not restricted to, a medical condition, a doctor serving the user, a name of the hospital, a name of the institute, and the like. Next, control of process 500 proceeds to step 512, at which it is determined whether the user is authenticated or not. If the user is not authenticated then control of process 500 proceeds to step 514. Otherwise, control of process 500 proceeds to step 516.

Next, control of process 500 proceeds to the step 514, at which the user is not allowed to access the service and the process 500 concludes, according to an embodiment of the present invention. For example, in the above case, if a user other than the patient may desire to access the medical history then an access request to the medical history may be rejected.

Further, at step 516, the user is authorized based on the authentication of the user and then may provide access to the service based on the authorization, according to an embodiment of the present disclosure. For example. In the above case, an access may be provided to the patient to access the medical history.

Figure 6:
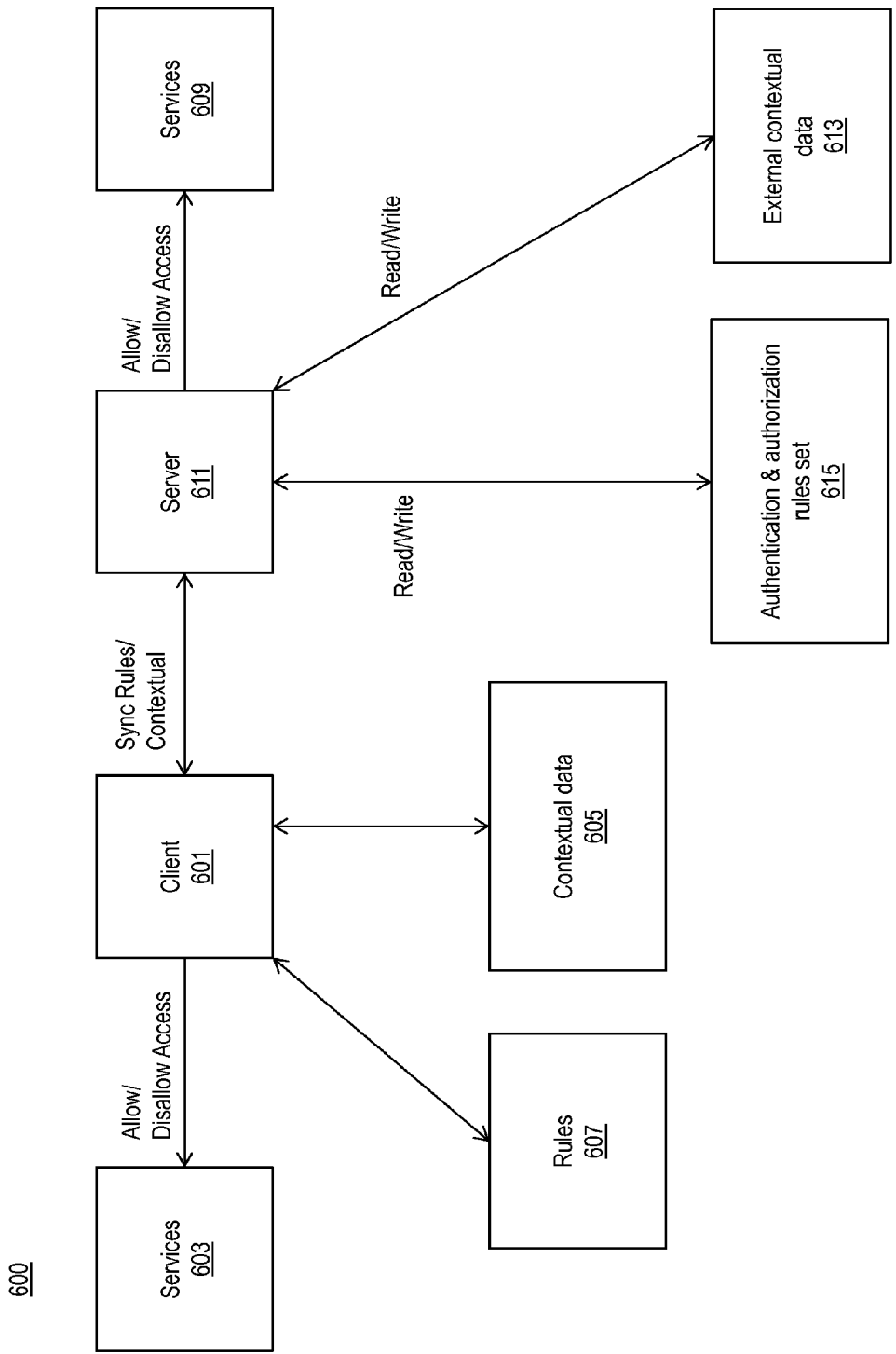
FIG. 6 depicts an exemplary environment for dynamic authentication of a user according to an embodiment of the present disclosure.

FIG. 6 depicts an exemplary environment for dynamic authentication of a user according to an embodiment of the present disclosure. A user may generate a request from a client 601 such as a mobile device, to access a service 603. The client 601 may allow or disallow the user to access the service 603. The service 603 may be, but not restricted to, access sensitive data, such as account summary, stored within the client 601. An authentication of the user may be first performed at the client 601. For this purpose, the client 601 may access contextual data 605 and rules 607. In an implementation, the contextual data 605 may be accessed from the user database 205, the contextual database 207, or a combination thereof. Based on the contextual data 605 and the rules 607, the client 601 may allow or disallow the user to access the services 603. In case, if the user desires to access services 609 stored on a server 611, then a second authentication process may be performed on the server 611 side. For the second authentication, the server 611 determines contextual data 613 associated with the user and determines authentication and authorization rules from authentication and authorization rules set 615. In an implementation, the contextual data 613 may be accessed from the user database 205, the contextual database 207, or a combination thereof. These rules set may be read or write/modified may be dynamically based on the contextual data 613. The client 601 and the server 611 may synchronize the rules 607 with the rules from authentication and authorization rules set 615 and the contextual data 605 with the contextual data 613, and may then allow or disallow the user to access to the services 609.

Figure 7:
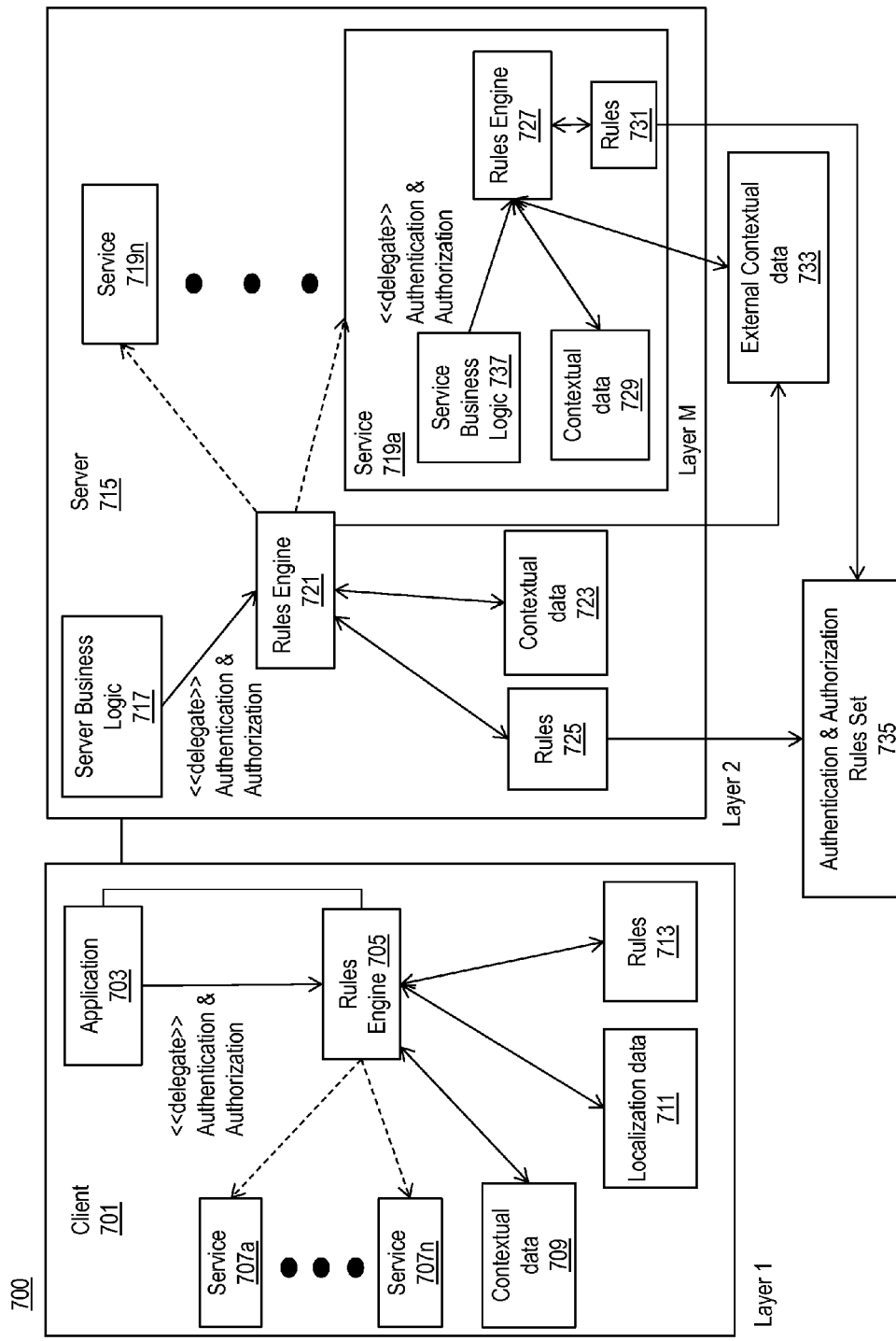
FIG. 7 depicts an exemplary scenario for dynamic multi-layer authentication of a user according to another embodiment of the present disclosure.

FIG. 7 depicts an exemplary scenario for dynamic multi-layer authentication of a user according to another embodiment of the present disclosure. A user may generate a request from a client 701 such as a mobile device, to access a client service 707a-707n. The user may access the client service 707a-707n through an application 703. The client 701 may allow or disallow the user to access the service 707a-707n. The services 707a-707n may be, but not restricted to, access sensitive data, such as transaction details, medical records, and the like, stored within the client 701. An authentication of the user may be first performed at the client 701 side. For this purpose, the application 703 of the client 701 may delegate the rule engine 705 to authenticate and authorize the user that requested to access client service 707a-n. The rule engine 705 may then access contextual data 709, localization data 711 and rules 713. In an implementation, the contextual data 709 may be accessed from the user database 205, the contextual database 207, or a combination thereof. Based on the contextual data 709, localization data 711 and rules 713, the client 701 may authenticated and authorized the user to allow access to one of the services 707a-707n. Therefore, the first authentication layer is at the client side 701. The second authentication layer is at the server side 715.

In case, if the user desires to access services 719a-719n stored on the server 715, then a second authentication process may be performed on the server 715. The server business logic 717 may delegate the rule engine 721 that the server 715 may desire to authenticate and authorize the user. The rule engine 721 determines contextual data 723 associated with the user and determines rules 725. In an implementation, the contextual data 723 may be accessed from the user database 205, the contextual database 207, or a combination thereof. Based on the rules, the user is authenticated and authorized to allow or disallow access to one of the services 719a-719n. Furthermore, another authentication is performed at 'layer M'. The authentication of the user may be performed at the service level, such as first service 719a. In first service 719a, service business logic 737 may delegate the rules engine 727 that first service 719a may desire to authenticate and authorize the user. The rules engine 727 determines contextual data 729 associated with the user and determines rules 731. In an implementation, the contextual data 729 may be accessed from the user database 205, the contextual database 207, or a combination thereof. Based on the rules 731, authentication and authorization rules set 735, or a combination thereof, the user is authenticated and authorized to allow access to one of the first service 719a. Therefore, the authentication and authorization of the user may be performed at multi-layers. In various embodiments of the present disclosure, the authentication and authorization may be performed at all, a part, or any one of the layers, i.e., at a user device, a server, or at the service itself.

Figure 8:
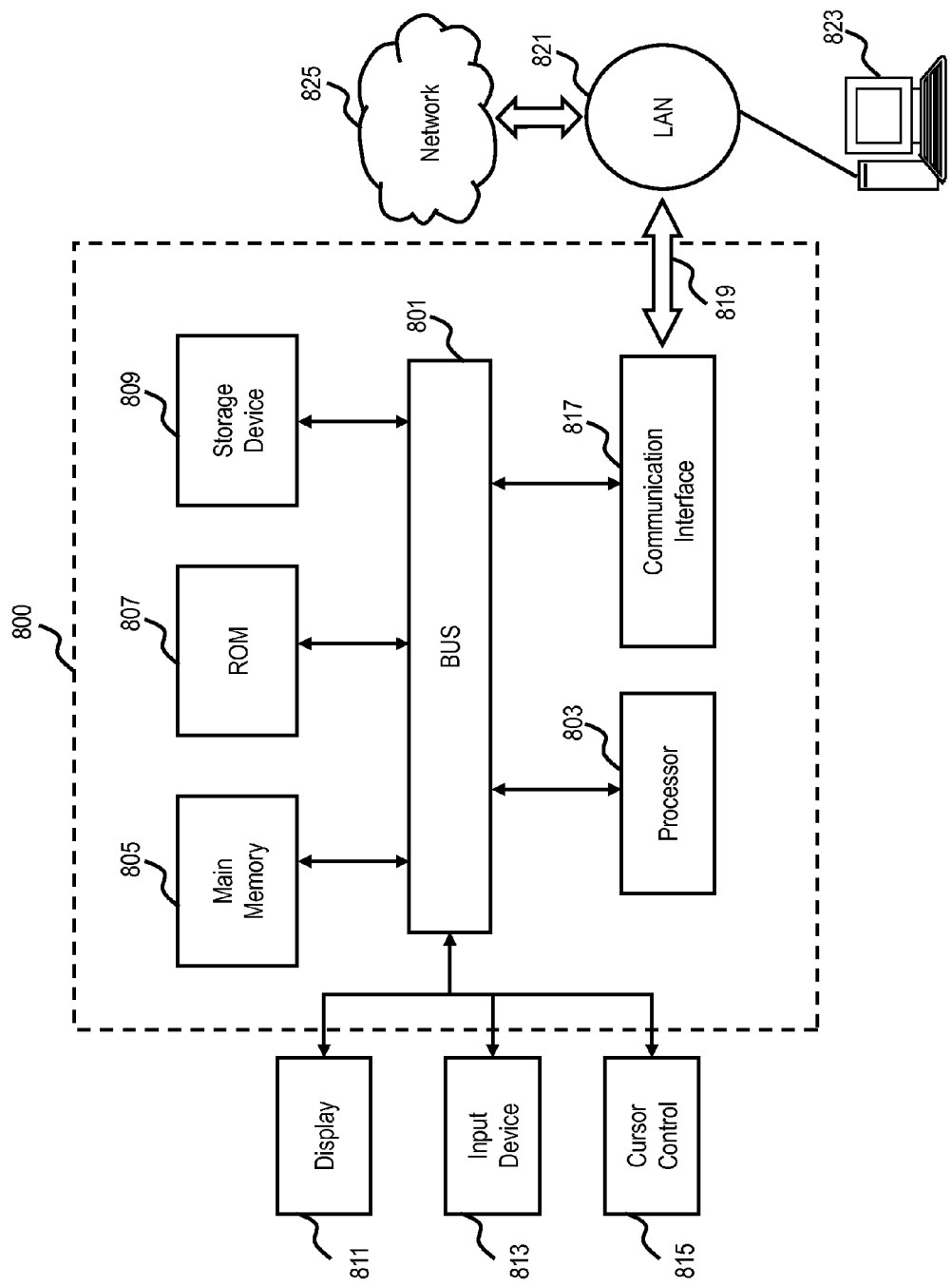
FIG. 8 depicts a computer system that can be used to implement various exemplary embodiments of the present disclosure.

FIG. 8 illustrates a computing hardware (e.g., mobile system) 800 on which exemplary embodiments may be implemented. The mobile system 800 includes a bus 801 or other communication mechanism for communicating information and a processor 803 coupled to the bus 801 for processing the information. The mobile system 800 also includes a main memory 805, such as a Random Access Memory (RAM) or other dynamic storage device, coupled to the bus 801 for storing the information and instructions to be executed by the processor 803. The main memory 805 also may be used for storing temporary variables or other intermediate information during execution of instructions by the processor 803. The mobile system 800 may further include a Read Only Memory (ROM) 807 or other static storage device coupled to the bus 801 for storing static information and instructions for the processor 803. A storage device 809, such as a magnetic disk or an optical disk, is coupled to the bus 801 for persistently storing information and instructions.

The mobile system 800 may be coupled via the bus 801 to a display 811, such as a Cathode Ray Tube (CRT), a liquid crystal display, an active matrix display, or a plasma display, for displaying information to the mobile user. An input device 813, such as a keyboard including alphanumeric and other keys, is coupled to the bus 801 for communicating information and command selections to the processor 803. Another type of a user input device may be a cursor control 815, such as a mouse, a trackball, or cursor direction keys, for communicating direction information and command selections to the processor 803 and for controlling cursor movement on the display 811.

According to an exemplary embodiment, the processes described herein are performed by the mobile system 800, in response to the processor 803 executing an arrangement of instructions contained in the main memory 805. Such instructions may be read into the main memory 805 from another computer-readable medium, such as the storage device 809. Execution of the arrangement of instructions contained in the main memory 805 causes the processor 803 to perform the process steps described herein. One or more processors in a multi-processing arrangement also may be employed to execute the instructions contained in the main memory 805. In alternative embodiments, hard-wired circuitry may be used in place of or in combination with software instructions to implement exemplary embodiments. Thus, exemplary embodiments are not limited to any specific combination of hardware circuitry and software.

The mobile system 800 also may include a communication interface 817 coupled to the bus 801. The communication interface 817 provides a two-way data communication coupling to a network link 819 connected to a Local Area Network (LAN) 821. For example, the communication interface 817 may be a Digital Subscriber Line (DSL) card or modem, an Integrated Services Digital Network (ISDN) card, a cable modem, a telephone modem, or any other communication interface to provide a data communication connection to a corresponding type of communication line. As another example, the communication interface 817 may be a Local Area Network (LAN) card (e.g., for Ethernet™ or an Asynchronous Transfer Mode (ATM) network) to provide a data communication connection to a compatible LAN. Wireless links also may be implemented, in one embodiment. In any such implementation, the communication interface 817 sends and receives electrical, electromagnetic, or optical signals that carry digital data streams representing various types of information. Further, the communication interface 817 may include peripheral interface devices, such as a Universal Serial Bus (USB) interface, a Personal Computer Memory Card International Association (PCMCIA) interface, etc. Although a single communication interface 817 is depicted in FIG. 8, multiple communication interfaces also may be employed.

The network link 819 typically provides data communication through networks to other data devices. For example, the network link 819 may provide a connection through the LAN 821 to a host computer 823, which has connectivity to a network 825 (e.g., a Wide Area Network (WAN) or the global packet data communication network now commonly referred to as the "Internet") or to data equipment operated by a service provider. The LAN 821 and the network 825 both use electrical, electromagnetic, or optical signals to convey information and instructions. The signals through the various networks and the signals on the network link 819 and through the communication interface 817, which communicate digital data with the mobile system 800, are exemplary forms of carrier waves bearing the information and instructions.

The mobile system 800 may send messages and receive data, including program code, through the network(s), the network link 819, and the communication interface 817. In the Internet example, a server (not shown) might transmit requested code belonging to an application program for implementing an exemplary embodiment through the network 825, the LAN 821 and the communication interface 817. The processor 803 may execute the transmitted code while being received and/or store the code in the storage device 809, or other non-volatile storage for later execution. In this manner, the mobile system 800 may obtain application code in the form of a carrier wave.

An advantage of embodiments of the invention is that changes to rules and an authentication information set are made at the configuration level and not at the application source code level. Therefore, the application itself will not need to change in order to support on-the-fly changes to rules and an authentication information set that would affect the application workflow, user experience, user interface, access control and authentication, and so forth. From an implementation perspective, the configuration may be managed by the computing platform (e.g., client 601) and rules engine 727. Rules engine 727 may take the configurations and manage the required behavior accordingly. Also, the application may use an API to learn what or which information needs to be inquired from the user before initiating the authentication process. Next, the API also may be used to allow one or more mobile applications, one or more server applications, or a combination thereof for utilizing the dynamic authorization mechanism.

Embodiments in accordance with the present disclosure provide an enhancement to the current way of doing authentication authorization in the background art. Embodiments authenticate by using contextual situation of content in a dynamic way with a set of potential rules that may be determined dynamically as well. This may be performed in the context of a trusted client, e.g., a mobile device, a browser, etc., which is able to take part in authentication and authorization at the client because the client is trusted by the server. A server may publish dynamic contextual content and rules to the client, and then the client is able to handle authentication authorization independently of the server. Embodiments facilitate a trusted client to work offline as well as online, and be able to authenticate and authorize users, to validate the user pin, to validate the user based on contextual content, and is able to do that without changes to the application computer code, thus not requiring programming skills.

Embodiments in accordance with the present disclosure may utilize the client to store information that is accessible even if the client is offline (i.e., not communicatively connected to a remote server), such as in a location with poor or no wireless signals (e.g., in a basement or center portion of a large building).

Contextual and situational content may be illustrated with respect to time-based examples, e.g., behavioral habits that change in a predictable pattern according to a time metric (e.g., time of day, day of week, day of month, etc.). For example, suppose that in a medical context, access to patient data in a mobile device is required. Conventionally, only a username and password may be used. In contrast, embodiments using contextual and situation content may ask for information about the last session with the doctor, or the medical problem, or the last drug prescribed, etc. Answers to these kind of contextual and situation questions are usually known only by an authorized user who is trying to get access to the information.

In another example, contextual information may refer to information about where the device is located, not just geographically located, but also topologically located in a network (e.g., by the subnet or region assigned to an IP address associated with the mobile device). However, contextual information does not necessarily try to localize the mobile device. Contextual may be based on information that the user holds, e.g., information about the user and related to the user.

Embodiments in accordance with the present disclosure are beneficial with offline applications, such that no live communication line is needed between a mobile device and the server. For example, the mobile device may have protected data stored in a protected area of memory, and the user at the mobile device will not be able to access that protected data storage until they provide the correct credentials on the mobile device. Embodiments provide a more secure way of making sure that the user is not only an authentic user, but also is authorized to be accessing that data at that time.

Embodiments in accordance with the present disclosure may provide complex access control. For example, complex access control may be used to validate sets of rules that are interdependent from each other, and the sets of rules need to be validated in order to give access to a specific resource or to authorize or to authenticate a source. For an example of a rule, suppose a user needs so be admitted to a hospital. Separate authentication rules may be provided whether it is a non-emergency admission (for which time is available to answer questions), or an emergency admission (for which no time is available). Embodiments may provide additional complexity to accommodate multiple different users, and each then may use different rules specifically associated with each of the users associated with the server or the portions of the system. Embodiments also may be granular, meaning that even if different users go to a same hospital using the same hospital application, each user will have specific scenarios, situations and rules associated with the user.

The term "computer-readable medium" as used herein refers to any medium that participates in providing instructions to the processor 803 for execution. Such a medium may take many forms, including but not limited to non-volatile media, volatile media, and transmission media. Non-volatile media may include, for example, optical or magnetic disks, such as the storage device 809. Volatile media may include a dynamic memory, such as the main memory 805. Transmission media may include coaxial cables, copper wire and fiber optics, including the wires that include the bus 801. Transmission media also may take the form of acoustic, optical, or electromagnetic waves, such as those generated during Radio Frequency (RF) and infrared (IR) data communications. Common forms of computer-readable media may include, for example, a floppy disk, a flexible disk, hard disk, magnetic tape, any other magnetic medium, a CD-ROM, a Compact Disc-Rewritable (CDRW), a Digital Video Disk (DVD), any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read. In certain cases, the computer readable media may include an unknown physical component wherein the information is uniquely defined by a special digital unique identifier and is available through multiple physical channels either simultaneously or exclusively.

Various forms of computer-readable media may be involved in providing instructions to a processor for execution. For example, the instructions for carrying out at least part of the exemplary embodiments may initially be borne on a magnetic disk of a remote mobile device. In such a scenario, the remote mobile device loads the instructions into the main memory and sends the instructions over a telephone line using a modem. A modem of a local computer system receives the data on the telephone line and uses an infrared transmitter to convert the data to an infrared signal and transmit the infrared signal to a portable computing device, such as a Personal Digital Assistant (PDA) or a laptop. An infrared detector on the portable computing device receives the information and instructions borne by the infrared signal and places the data on a bus. The bus conveys the data to a main memory, from which a processor retrieves and executes the instructions. The instructions received by the main memory can optionally be stored on storage device either before or after execution by processor.

Embodiments of the present disclosure provide a number of advantages. First, embodiments of the present disclosure provide a method that allows an application (e.g., mobile applications, desktop applications, web applications, etc.) to utilize a dynamic authentication process, with optional dynamic authorization, for user access. This may further allow the application to automatically manage user engagements and access to business logics or pre-transactions. Also, embodiments of the present disclosure determine when transactions can be initiated from client application to a server application.

Next, embodiments of the present disclosure enables applications to support rules and information set associated with access information at multiple points/layers of the application (e.g., access to the client application business logic, transactions, and server side access and permissions). Because of the interactive and transactional characteristics of applications, authentication and authorization information sets can be managed and downloaded in "real time". Further, embodiments of the present disclosure different users may have different rules for authentication and authorization.

Embodiments of the present invention include a system having one or more processing units coupled to one or more memories. The one or more memories may be configured to store software that, when executed by the one or more processing unit, allows practice of embodiments described herein.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of embodiments of the invention. Certain exemplary embodiments may be identified by use of an open-ended list that includes wording to indicate that the list items are representative of the embodiments and that the list is not intended to represent a closed list exclusive of further embodiments. Such wording may include "e.g.", "etc.," "such as," "for example", "and so forth", "and the like", etc., and other wording as will be apparent from the surrounding context.

No element, act, or instruction used in the description of the present application should be construed as critical or essential to embodiments of the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A computer implemented method to dynamically authenticate a user at a user device, comprising:
   receiving, at the user device, one or more user inputs from the user;
   pre-authenticating the user based on the one or more user inputs, wherein the pre-authentication is performed at the user device;
   receiving, at the user device, a first request from the user to access a client service associated with the user device upon successful pre-authentication of the user;
   authenticating the user based on a set of client rules retrieved from a database stored at the user device, wherein the authentication is performed at the user device, and wherein the set of client rules is associated with the user device;
   determining a contextual data associated with the user;
   dynamically modifying, based on at least the contextual data, the set of client rules;
   receiving, at a server, a second request from the user to access a service associated with the server upon successful pre-authentication of the user, wherein the server is remote from the user device;
   dynamically modifying, based on at least the contextual data, a set of server rules; and
   authenticating the user based on the modified set of server rules, wherein the authentication is performed at the server,
   wherein the contextual data includes at least one of a date of request, a time of request, one or more user device parameters, and work state of the user.

2. The method of claim 1, further comprising:
   authorizing the user to access the service based on the authentication.

3. The method of claim 2, further comprising:
   prior to authorizing the user, determining, based on the contextual data, at least one rule from the set of client rules to authorize the user.

4. The method of claim 3, further comprising:
   determining localization data associated with the user.

5. The method of claim 4, wherein the determination of the at least one rule from the set of client rules is based on at least one of the contextual data and the localization data.

6. The method of claim 1, wherein the work state of the user indicates whether the user is on duty, or whether the user is on a break.

7. The method of claim 1, further comprising:
   receiving one or more rules over a computer network; and
   updating a server rules database for the received one or more rules.

8. The method of claim 1, wherein the service is provided by a remote device over a network.

9. The method of claim 1, wherein authenticating the user further comprises determining a level of authentication of the user.

10. The method of claim 9, further comprising determining a level of authorization based on the level of authentication.

11. The method of claim 9, further comprising determining a level of authorization based on the level of authentication and a rule from the rules database to authorize the user.

12. The method of claim 1, wherein the one or more user inputs includes at least one of a username, a password, and a biometric identity.

13. A system to dynamically authenticate a user, comprising:
   a user device configured to:
      receive one or more user inputs from the user;
      pre-authenticate the user based on the one or more user inputs;
      receive a first request from the user to access a client service associated with the user device upon successful pre-authentication of the user;
      authenticate the user based on a set of client rules retrieved from a database stored at the user device, wherein the authentication is performed at the user device, and wherein the set of client rules is associated with the user device;
      determine a contextual data associated with the user; and
      dynamically modify, based on at least the contextual data, the set of client rules; and
   a server remote from the user device and communicatively coupled to the user device, the server configured to:
      receive a second request from the user to access a service associated with the server upon successful pre-authentication of the user;
      dynamically modify, based on at least the contextual data, a set of server rules; and
      authenticate the user based on the modified set of server rules, wherein the contextual data includes at least one of a date of request, a time of request, one or more user device parameters, and work state of the user.

14. The system of claim 13, wherein the server is further configured to authorize the user to access the service based on the authentication.

15. The system of claim 13, wherein the user device is further configured to determine localization data associated with the user.

16. The system of claim 15, wherein the user device is further configured to determine at least one rule from the set of client rules based on at least one of the contextual data and the localization data.

17. The system of claim 13, wherein the work state of the user indicates whether the user is on duty, or whether the user is on a break.

18. The system of claim 13, wherein the server is further configured to:

receive one or more rules over a computer network; and update a server rules database for the received one or more rules.

19. The system of claim 13, wherein the server is further configured to determine a level of authentication of the user.

20. The system of claim 19, wherein the server is further configured to determine a level of authorization based on the level of authentication.

21. The system of claim 13, further comprising an Application Programming Interface to allow one or more mobile applications, one or more server applications, or a combination thereof to dynamically authorize the user.

22. The system of claim 13, wherein the server is further configured to authenticate the user based at least on a user specific data.

* * * * *

UNITED STATES PATENT AND TRADEMARK OFFICE
CERTIFICATE OF CORRECTION

PATENT NO.       : 9,959,398 B1
APPLICATION NO.  : 14/700811
DATED            : May 1, 2018
INVENTOR(S)      : Blair et al.

Page 1 of 1

It is certified that error appears in the above-identified patent and that said Letters Patent is hereby corrected as shown below:

On the Title Page

Item (*), Column 1, under "Notice", Line 3, delete repeated word "days.".

Item (74), Column 2, under "Attorney; Agent, or Firm", Line 1, replace "Maldjiian" with "Maldjian".

In the Claims

In Column 18, Claim 11, Line 3, delete "rules" thereof.

Signed and Sealed this
Twenty-sixth Day of June, 2018

Andrei Iancu
*Director of the United States Patent and Trademark Office*